(12) United States Patent
Mukherjee

(10) Patent No.: US 6,571,252 B1
(45) Date of Patent: May 27, 2003

(54) SYSTEM AND METHOD FOR MANAGING PERSISTENT OBJECTS USING A DATABASE SYSTEM

(75) Inventor: Rajat Mukherjee, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/548,259

(22) Filed: Apr. 12, 2000

(51) Int. Cl.[7] .................................. G06F 17/30
(52) U.S. Cl. ............................ 707/103; 707/10
(58) Field of Search ................... 707/10, 100, 101, 707/102, 103, 104, 3, 1, 200

(56) References Cited

U.S. PATENT DOCUMENTS

| | | | | |
|---|---|---|---|---|
| 5,581,761 A | | 12/1996 | Radia et al. ............... 395/702 |
| 5,613,099 A | | 3/1997 | Erickson et al. ............ 395/500 |
| 5,809,507 A | * | 9/1998 | Cavanaugh, III ............ 707/10 |
| 5,809,508 A | | 9/1998 | Blackman et al. .......... 707/103 |
| 5,809,509 A | | 9/1998 | Blackman et al. .......... 707/103 |
| 5,848,419 A | | 12/1998 | Hapner et al. .............. 707/103 |
| 6,138,143 A | * | 10/2000 | Gigliotti et al. ............. 707/201 |
| 6,223,184 B1 | * | 4/2001 | Blackman et al. ...... 707/103 R |
| 6,339,782 B1 | * | 1/2002 | Gerard et al. ................. 709/1 |
| 6,351,751 B1 | * | 2/2002 | Traversat et al. ....... 707/103 Y |
| 6,353,860 B1 | * | 3/2002 | Hare et al. .................. 709/316 |

* cited by examiner

Primary Examiner—Sanjiv Shah
(74) Attorney, Agent, or Firm—John L. Rogitz

(57) ABSTRACT

Management of a distributed object system containing persistent objects using a database management system. Persistent objects are stored in distributed object system files and the distributed object system is connected to a client application. A connection is created between a database system and the distributed object system for exchange of information between the database system and the distributed object system files. Control information is provided on the connection between the database system and the distributed object system files, which causes the distributed object system to control processing of the objects in the distributed object system files according to constraints established at the database system.

21 Claims, 9 Drawing Sheets

SYSTEM AND METHOD FOR MANAGING PERSISTENT OBJECTS USING A DATABASE SYSTEM

BACKGROUND OF THE INVENTION

1. Field of the Invention

The present invention relates generally to database systems and object systems, and particularly to managing persistent objects in a distributed object system using a database system.

2. Description of the Related Art

Object-oriented programming has allowed programmers to develop software without the constraints of particular languages, tools, operating systems, address spaces, networks, compilers or applications. This is possible because object-oriented programming languages allow computing systems executing a particular application to be viewed as a collection of individual objects that achieve the desired application function by exchanging messages among themselves.

In distributed computing environments it is desirable to access remote objects across computer networks. Standards are evolving for creating infrastructures in object-oriented programming languages which will allow a component, consisting of selected distributed objects, to exist on any network and communicate with other components, whether it be across desk tops or whole enterprises. One of the more pervasive standards is the Common Object Request Broker Architecture (CORBA) of the Object Management Group (OMG).

In the CORBA specification a client is given the ability to access an object through an object reference to that object. The object reference is the information needed to specify an object to an Object Request Broker (ORB). Object references not only allow objects to be identified in a request from a client to an ORB, but also can be used to carry metastate for persistent objects. A persistent object is one that can continue to exist even if a machine is removed or disconnected from the network. The metastate for a persistent object is the critical data needed to restore the persistent object when it does not exist in the memory of the ORB's process.

Another widely used standard for the management of objects in a distributed computing environment is Java Remote Method Invocation (RMI). Java RMI is a mechanism that allows one to invoke a method on an object that exists in another address space. The other address space could be on the same machine or on a different machine. While CORBA is a language-independent standard, Java RMI provides for remote communication only between programs written in the Java programming language. There are three processes that participate in supporting remote method invocation with Java RMI. The Client is the process that is invoking a method on a remote object. The Server is the process that owns the remoter object, which exists as an ordinary object in the address space of the server process. The Object Registry is a name server that relates objects with names. Objects are registered with the Object Registry. Once an object has been registered, one can use the Object Registry to obtain access to a remote object using the name of the object.

However, CORBA, Java RMI and other distributed object management systems do not provide a means by which the objects themselves, or their persistent states are managed in a coordinated and uniform manner. In particular, the state of persistent objects, referred to as object instances, change dynamically based on method invocations on these objects. There are complex systems that enable instantiation of these objects on demand (called Activation in Java RMI), to be able to handle large numbers of objects, only some of which could be active at a given time. Persistence is achieved explicitly by writing out the object state to relational databases, or to file systems. However, the management of the object identities, their persistent state and the programs that encapsulate their behavior has not been performed in a generally uniform way in the past.

As a result of their limited management capabilities, distributed object systems such as Java RMI are not always able to manage the object system with integrity and robustness. For example, the persistence and transactional semantics of the object system may not be clearly defined. Also, access control cannot always be adequately enforced. Furthermore, such systems do not provide automated and coordinated backup and recovery of the state of the object system (and not just individual objects). This limits the complexity of transactions that can occur within the object system.

The limitations on the management capabilities of object systems are due, in part, to the fact that objects generally exist as files within an object system, which operates as a type of file system. File systems in general perform various functions for users. These include: accessing data stored in files, managing files, managing direct access storage space where files are kept, and guaranteeing the integrity of files. File systems however, are not aware of the internal structure of the file and, therefore, cannot provide access to them in response to requests that presume knowledge of such structure. For example, if a file system stores movies, the system would be able to locate and retrieve a file in which a digitized version of a particular title is stored, but would not be able to respond to a request to return the titles of all movies made by a particular director.

A database system however, can provide such searching capability. Ordinarily, in a database features of an object (such as a digitized image of a movie) are extracted from the file, formatted according to the database system structure, and then used by the database system to support the search of stored objects based on the extracted features. Database systems however, are generally set up to store, access, and retrieve only relatively short objects, such as records. The raw content of a large object captured in a file system may be so vast as to be impractical to structure for a database request.

Conventional distributed object systems exist as files on file servers that have constraints that are different from a database system. They are not necessarily database-aware since they do not invoke database commands. Hence, the full management power of database systems cannot currently be used to manage such object systems.

Technology available from IBM (DB2 Universal Database) and Oracle allows management of files as though they are logically part of the database system (as Binary Large Objects or BLOBS). Some database systems provide object views and method invocations in the database by enabling flavors of database query languages that support method invocations to objects within the database. Many systems enable object views over database schema to enable external applications to treat the data within the database as objects.

However, there is a need for a technique that provides the persistence and management capabilities of database systems in the management of distributed objects residing outside the database system. There is also a need for a system to provide automated backup and recovery of the state of distributed object systems. There is also a need for a system to provide clearly defined persistence and transactional semantics to permit more complex transactions to be performed by object systems.

SUMMARY OF THE INVENTION

A system and method for managing a distributed object system containing persistent objects. The invention allows the management capabilities of a database management system to be utilized in the management of a distributed object system. In one aspect of the invention, a method is provided for managing a distributed object system having objects stored in object system files, wherein the distributed object system is connected to a client application. A connection is created between a database system and the distributed object system for exchange of information between the database system and the distributed object system files. Control information is provided on the connection between the database system and the distributed object system files, which causes the distributed object system to control processing of the objects in the distributed object system files according to constraints established at the database system.

In another aspect of the invention a system is provided for managing a distributed object system that includes a server object, wherein objects are stored in files in the distributed object system. The system includes a database system, a client object, and a connection between the database system and the distributed object system. This connection allows the exchange of information between the database system and the distributed object system files. Also, control information is provided on the connection between the database system and the distributed object system files, which causes the distributed object system to control processing of the objects in the distributed object system files according to constraints established at the database system.

DETAILED DESCRIPTION OF THE DRAWINGS

The present invention provides techniques that permit the use of a database management system in the management of distributed object systems that reside outside a database system. The basic technology for enabling a database to control an external file system may be found in the Oracle product "iFS", or in the IBM product "Datalinks". Details of the Datalinks system are disclosed in U.S. Pat. No. 6,029,160, the contents of which are incorporated herein by reference.

A preferred embodiment of the invention described below illustrates the teachings of the invention using the Datalinks system as a link between the database and the object file system. This preferred embodiment provides one way to practice the invention. Hence, those skilled in the art will appreciate that these teachings may be readily applied using other systems such, as the file-system interface of Oracle iFS or other such system.

Likewise, while the teachings of the invention as described herein are illustrated as applied to the management of the Java RMI distributed object system, their application to other object systems such as CORBA, will be readily apparent to those skilled in the art.

Figure 1:
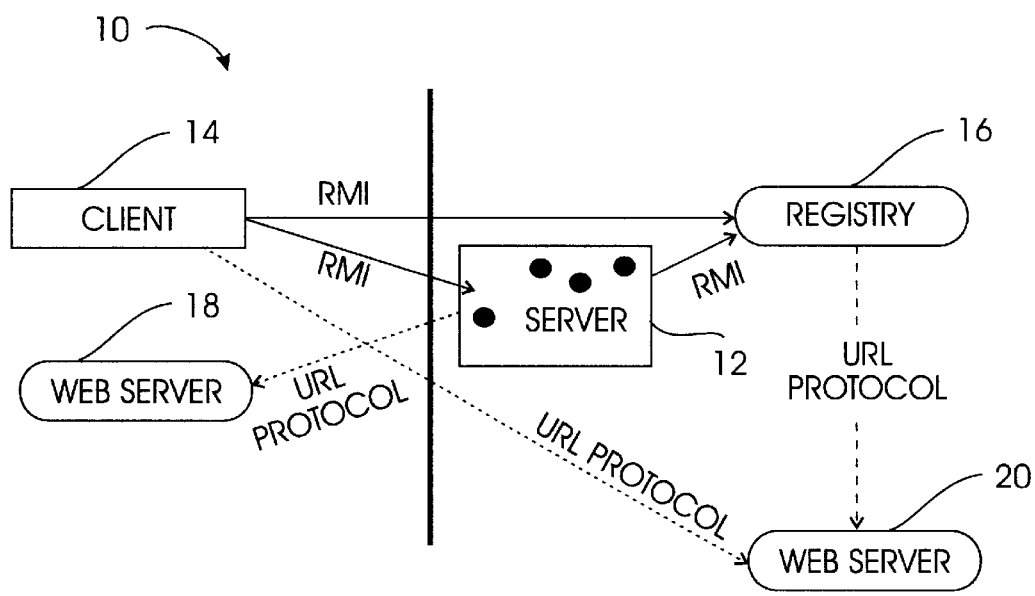
FIG. 1 shows a block diagram of a distributed object system in accordance with the prior art.

FIG. 1 shows a block diagram of a conventional distributed Java RMI system 10. RMI applications usually are comprised of two separate programs; a server 12 and a client 14. A typical server application creates some remote objects, makes references to them accessible, and waits for clients 14 to invoke methods on these remote objects. A typical client application gets a remote reference to one or more remote objects in the server and then invokes methods on them. The RMI system 10 provides the mechanism by which the server 12 and the client 14 communicate and pass information back and forth. Such an RMI system 10 is sometimes referred to as a distributed object application.

The RMI system 10 performs three primary functions. First, the RMI system 10 locates remote objects. Applications can obtain references to remote objects by registering its remote objects with the RMI system's naming facility, the RMI Registry 16. Alternatively the application can pass and return remote object references as part of its normal operations. The second function is to communicate with remote objects. Details of communication between remote objects are handled by the RMI system so that to the programmer, remote communication looks like a standard Java method invocation. The third function of the RMI system 10 is to load class bytecodes for objects that are passed around. Because RMI allows a caller to pass objects to remote objects, RMI provides the necessary mechanisms for loading an object's code, as well as for transmitting its data.

One of the central and unique features of RMI is its ability to download the bytecodes (or simply code) of an object's class if the class is not defined in the receiver's virtual machine. The types and behavior of an object, previously available only in a single virtual machine, can be transmitted to another, possibly remote, virtual machine. RMI passes objects by their true type, so the behavior of those objects is not changed when they are sent to another virtual machine. This allows new types to be introduced into a remote virtual machine, thus extending the behavior of an application dynamically.

Like any other application, a distributed application built using Java RMI is made up of interfaces and classes. The interfaces define methods, and the classes implement the methods defined in the interfaces, and perhaps, define additional methods as well. In a distributed application some of the implementations are assumed to reside in different virtual machines. Objects that have methods that can be called across virtual machines are called remote objects.

FIG. 1 shows how an RMI distributed application uses the registry 16 to obtain a reference to a remote object. The server 12 is the process that owns the remote object. The remote object is an ordinary object in the address space of the server process. The server 12 calls the registry to associate (or bind) a name with a remote object. The client 14 is the process that looks up the remote object by its name in the server's registry 16 and then invokes a method on a remote object.

Existing web servers 18 and 20 are used by the RMI system 10 to load class bytecodes, from server 12 to client 14, and from client to server, for objects when needed. The RMI system 10 treats a remote object differently from a non-remote object when the object is passed from one virtual machine to another. Rather than making a copy of the implementation object in the receiving virtual machine, the RMI system passes a remote stub for a remote object. The stub acts as the local representative, or proxy, for the remote object and basically is, to the caller, the remote reference. The caller invokes a method on the local stub, which is responsible for carrying out the method call on the remote object.

A stub for a remote object implements the same set of remote interfaces that the remote object implements. This allows a stub to be cast to any of the interfaces that the remote object implements. However, this also means that only those methods defined in a remote interface are available to be called in the receiving virtual machine.

Figure 2:
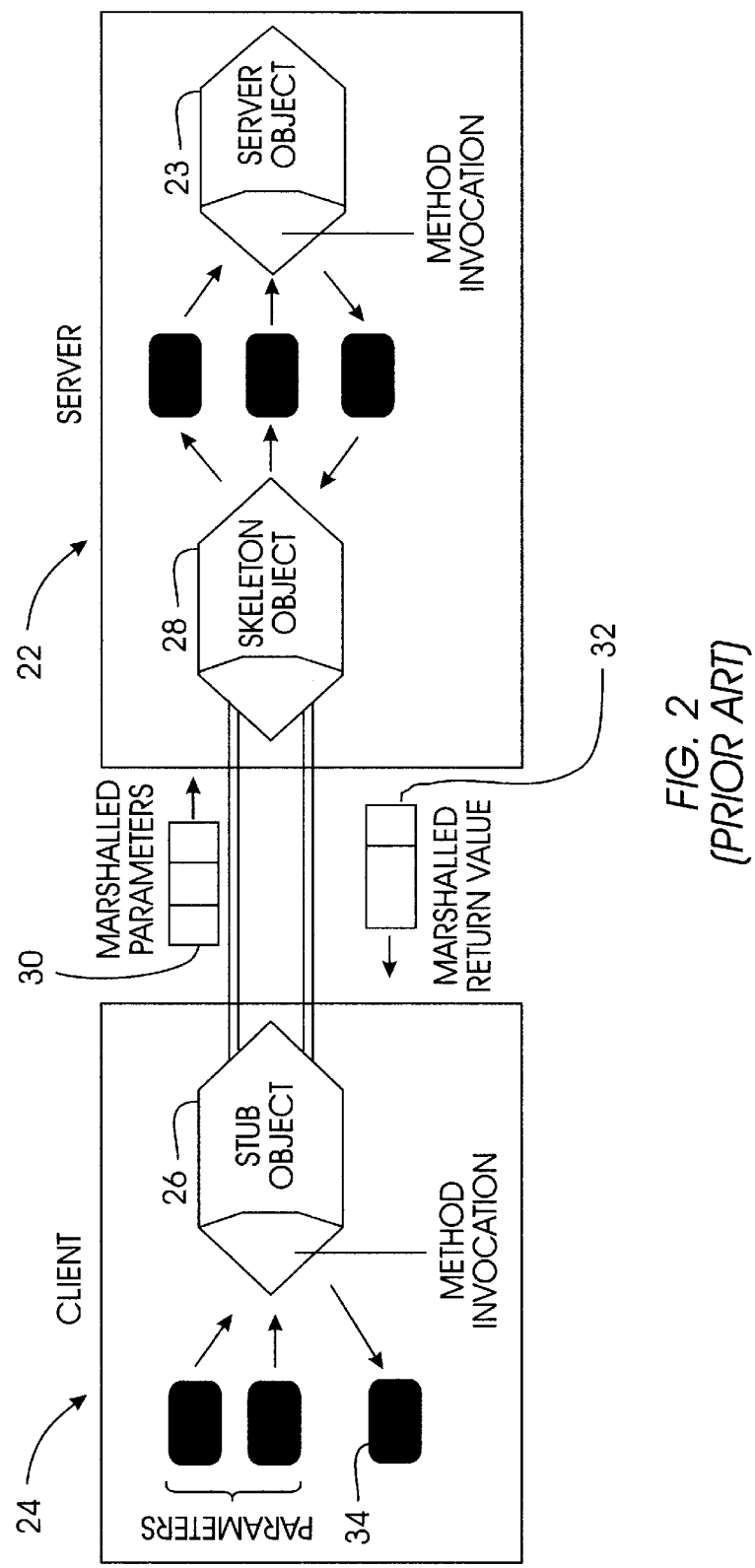
FIG. 2 shows a block diagram illustrating the mechanism for communicating between client and server machines according to Java Remote Method Invocation (RMI) in accordance with the prior art.

FIG. 2 shows an example of the use of stubs in referencing a remote object residing on a server 22 in a server machine 23 from code residing on a client machine 24. Besides the stub object 26 there is always another object acting as an intermediary object, called a skeleton object 28. When a remote method invocation comes up from the client 24 several tasks are handled by these two objects. The stub object 26 on the client machine 24 builds an information block that includes the following information: an identifier of the remote object to be used; an operation number describing the method to be called; and the marshaled parameters 30, which are method parameters that have to be encoded into a format suitable for transporting them across the net. The stub object 26 then sends this information to the server 22.

The skeleton object on the server 22 has the following tasks: un-marshal the marshaled parameters 30; call the desired method on the real object lying on the server; capture the return value, or exception of the call, on the server and marshal this value; and send a package 32 consisting of the value in the marshaled form back to the stub on the client machine 24. The stub object un-marshals the return value 32, or exception, from the server, which becomes the return value 34 of the remote method invocation. Alternatively, if the remote method threw an exception, the stub object 26 re-throws it in the process space of the caller.

Figure 3:
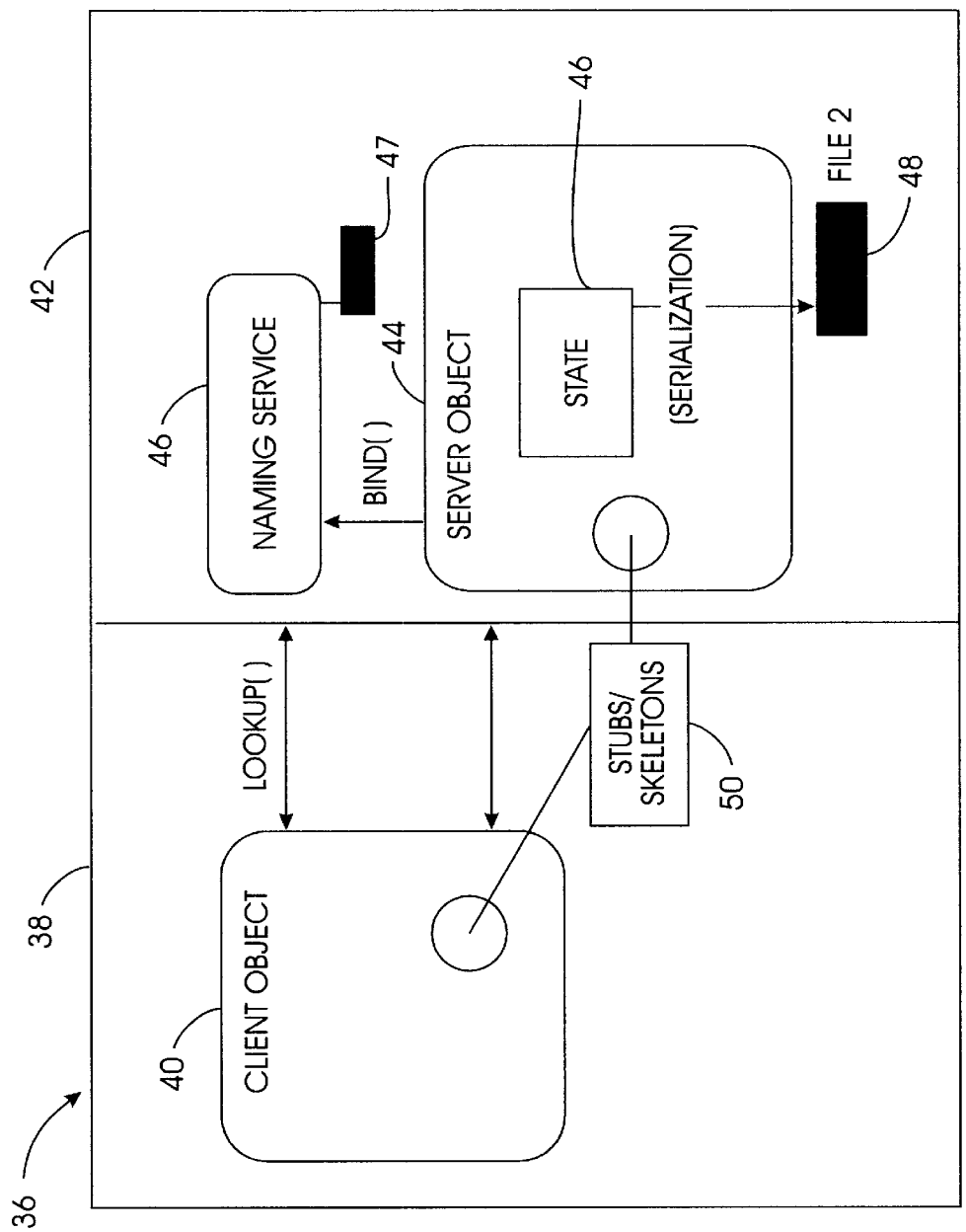
FIG. 3 shows a block diagram of an object system supporting object persistence in accordance with the prior art.

FIG. 3 is a block diagram showing additional details of a persistent object system 36 based on Java RMI. As discussed previously, persistent objects are objects that continue to exist after a machine is removed or disconnected from a network. The persistent object system 36 includes a client machine 38 having a client object 40, a server machine 42 having a server object 44 and a registry/naming service 46. The registry/naming service 46 is connected to a file 47 for storage of information related to the registry and naming functions. The persistent state of a object 46 is contained in the server object 44, which is connected to a server file 48, which is used to store the persistent state of a persistent object. This interface between the server object 44 and the server file 48 is done with the RMI serialization protocol, which is used to transport objects by value between Java virtual machines. Also, this serialization protocol is used to marshal call and return data.

To invoke a method on an object, a client looks up the object by name using the lookup( ) method on the naming service portion of the registry/naming service 46 which returns the remote object with the specified name in the registry. The naming service allows remote objects to be retrieved using the familiar Uniform Resource Locator (URL) syntax. The interface between the client machine 38 and the server machine 42 is accomplished using stub and skeleton objects 50, as discussed above in connection with FIG. 2. Before this occurs, the registry portion of the registry/naming service 46 has previously used the bind ( ) method to associate the name with the remote object, as shown in FIG. 1.

Figure 4:
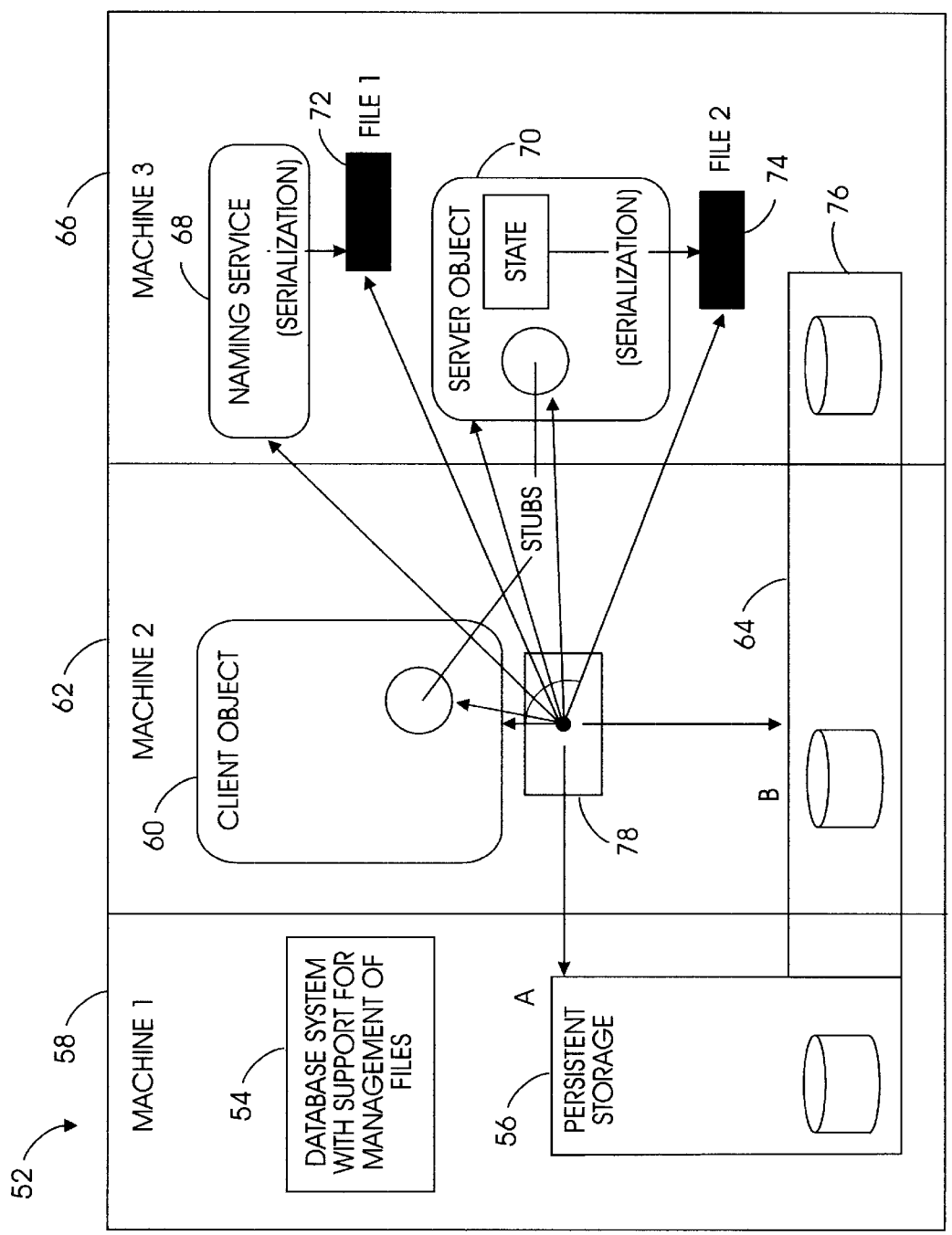
FIG. 4 shows a block diagram of a persistent object system managed by a database in accordance with a preferred embodiment of the invention.

FIG. 4 shows the persistent object system 52 with database management in accordance with a first preferred embodiment of the invention. A database system with support for the management of files 54 (discussed in more detail below in connection with FIGS. 6–9) and a first database data storage unit 56, are contained in a database machine 58. A client object, similar to client object 40 in FIG. 3, is contained in a client machine 62. A second database storage unit 64, coupled to the database storage unit 56, is also part of the client machine 62.

A server machine 66 includes the naming/registry service 68, and the server object 70 with associated files 72 and 74, which are similar to the corresponding components of the object system on the server machine 42 shown in FIG. 3. A third database storage unit 76 is also part of the server machine 66 and is also coupled to the database storage unit 56. Interface between the client object 60 and the server object 70 takes place using stubs and skeletons 71.

A set of object interfaces 78 represent the connections and interface operations between components of the database machine 58, the client machine 62 and the server machine 66. These interface operations include new Java RMI methods in accordance with the invention, as described below. With these methods, the persistent object system 52 can make all objects, in terms of their resources, and state, persistent into the database system 54. Furthermore, information about the objects can be managed within the database system 54. For example, overloading (re-implementing) the bind( ) method to the database system 54 will make the bind( ) service a database application. This will make the state of the naming/registry persistent by storing the state of the naming/registry service 68 in the persistent storage unit 56 of the database system 54. Similarly, overloading the lookup( ) method to the database system 54 will make it possible for a client to query the database system 54 on the database machine 58 about objects before connection to the naming/registry service 68. The naming( ) service can be made to be a database application by overloading this method to the database system 54.

Figure 5:
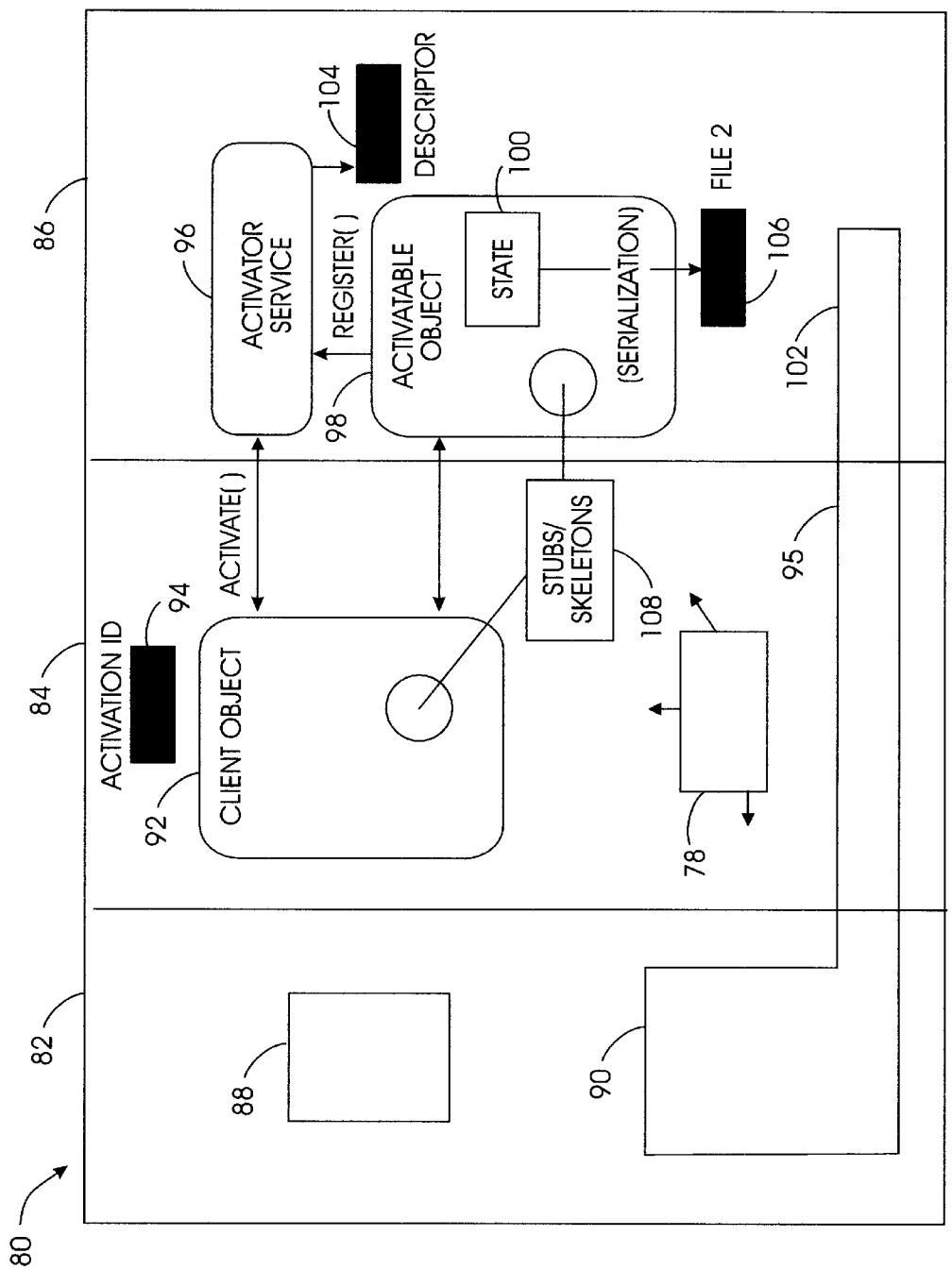
FIG. 5 shows a block diagram of a persistent object system with activation managed by a database in accordance with a preferred embodiment of the invention.

FIG. 5 shows a persistent object system with activation 80 and with database management in accordance with a second preferred embodiment of the invention. One relatively recent enhancement to Java RMI is called Remote Object Activation. This enhancement introduces support for persistent references to remote objects and automatic activation via these references. In an RMI system with activation a persistent object does not have to be active all the time. Such an object is said to be activatable, that is, when an object is invoked it can be activated on demand. To enable this feature the RMI system makes the necessary information about the activatable objects persistent. In FIG. 5 the persistent object system with activation 80 includes a database machine 82, a client machine 84 and a server machine 86. The database machine 82 includes a database system 88 with support for management of files and a database storage unit 90. The client machine 84 includes a client object 92, an activation ID object 94 and a client database storage unit 95.

The server machine 86 includes an activator service 96, an activatable server object 98 that includes the state of objects 100 and a server database storage unit 102. The activator service 96 is connected to a descriptor file 104 and the activatable server object 98 is coupled to an activation state file 106. Interface between the client machine 84 and the server machine 86 occurs using stubs and skeletons 108.

The activation ID object 94 includes identifiers of the activatable persistent server objects, which can be serialized into files and passed around the distributed environment. These activation IDs are linked into the database system 88 for robustness and expanded query. For example, other metadata about the objects, such as description, etc., are saved in the database system 88. This allows such metadata to be queried before the client uses the Activation ID to connect to the Activator object. Also, the register( ) method, as well as other equivalent methods, are redefined to save the persistent state of the activator descriptor 104 in the database system 88 when the object is registered to the activation system. The activator Descriptor 104 contains a pointer to where the persistent state of the object is stored. This location could by the database system 88 itself or a file such as the activation state file 106.

In general, for management, robustness, backup and recovery, all of the Java RMI activation system key methods are overloaded to the database system 88 to enforce saving the persistent state of activatable objects to the database system. Moreover, all information that the Java RMI activation system requires in a robust fashion is transparently managed by the database system 88. This information includes the system's own definitions and code, log files, etc. A preferred means to make the object state persistent within the database system 88 is by introducing a make_persistent( ) method. This method invokes the database across a network using standard approaches such as JDBC. This may be done explicitly within the server object definitions, or implicitly in appropriate methods that are invoked automatically by the system. When a link is created to an activatable object via a name or an Activation ID, initialization of a persistent object from the database state or file may be automatic. A database agent, shown in FIG. 5, invokes the necessary methods that register the required resources into the database. These resources include the appropriate code that the objects use. The database agent would also invoke the appropriate methods in the object system based on the definition of the type of link used. These methods include secure constructors or robust constructors that change the object characteristics to robust. Preferably, this done with access control, authentication and token monitoring.

The database agent 108 that resides on the server machine 86 could be implemented as part of the activation object system itself. Alternatively, the database agent 108 could reside outside the activation object system while interacting with it. Additional details of the general operation of such a database agent operating within an outside file system is shown below in FIGS. 6–9.

The persistent object system with activation 80 may optionally include various functions to control access. In a preferred embodiment an activatable server object 98 may only be activated by a user with appropriate authentication such as userid passwords or equivalents. This is accomplished by default secure constructors and initializers that will automatically invoke an authentication database, such as in conventional database access control. Once a user is authenticated, the activation process includes automatic initialization of a persistent object from the database state or file. A database granted token is required for authentication to allow for expiration of access. The token can be a parameter to one or more methods, and a conventional algorithm can be used to monitor the validity or expiration of the token. This enables database-like control in objects that reside in memory.

Additional optional functionality may be employed with the persistent object system with activation 80. This includes robust finalizers that enable automatic serialization and database updates upon object closure or deactivation. Methods such as begin_transaction( ), end_transaction( ), commit( ), etc., can cause appropriate actions in the database, or serialization of state into robust files, so as to provide a database-like transaction environment in a distributed object framework. These methods may be invoked implicitly or explicitly. For example, an explicit call to an object commit( ) method could initiate a serialization of the object state and linking of this serialized state to the database. Using the object synchronization methods, or using other object techniques, transactional semantics can be enforces by limiting the active concurrency within an object's methods. Unlinking a persistent object can cause cleanup of database dependencies and dynamically change the behavior of the object, allowing for higher performance while trading off security and robustness.

FIGS. 6–9 show preferred techniques for linking a database system with a filing system such as a persistent object system, in accordance with the invention. Further details of techniques for linking a database system with a general filing system are disclosed in U.S. Pat. No. 6,029,160, which has been incorporated by reference above.

Figure 6:
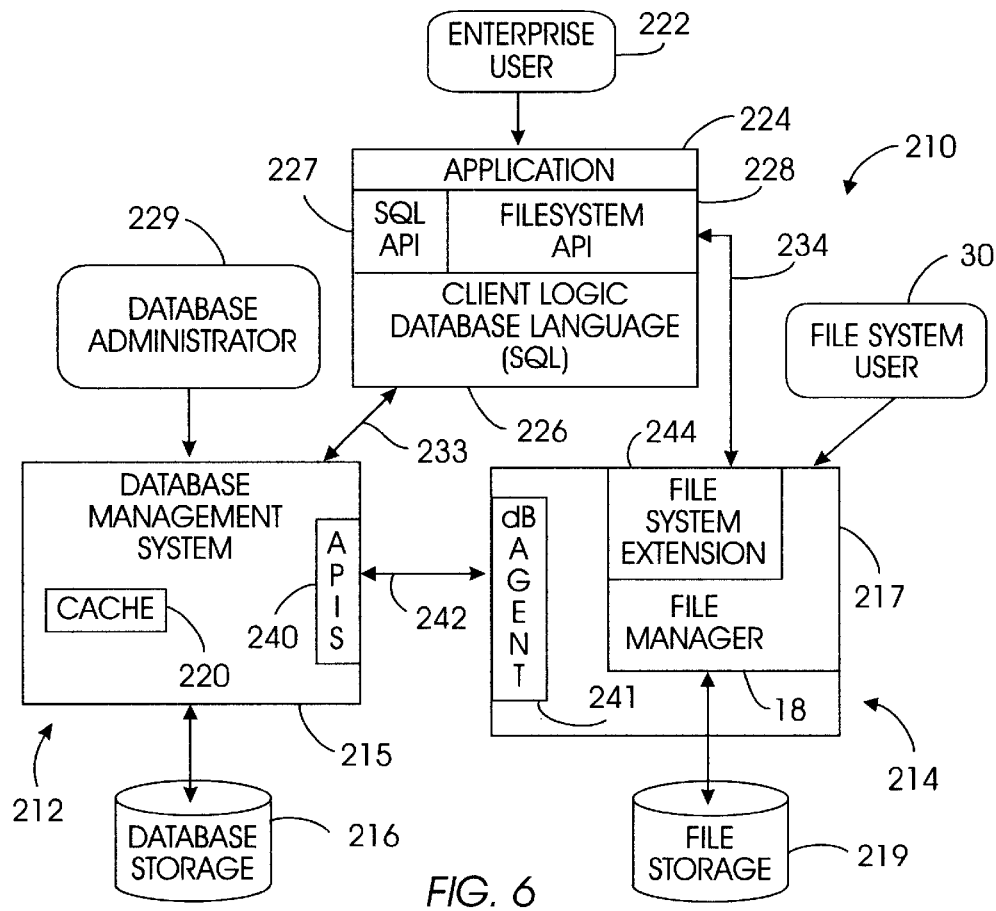
FIG. 6 shows a block diagram illustrating an enterprise system architecture according to the invention.

FIG. 6 illustrates an enterprise, a large system complex including one or more processors performing functions that together achieve a common goal, with the processors being linked or coupled to the degree necessary to achieve the goal. The enterprise system is indicated generally by 210 and includes a database system 212 and a file system 214. The database system 212 includes a conventional database management system (DBMS) 215 that provides views of, and access to, a database kept on one or more database storage devices 216. The enterprise system 210 also includes a file system 214 with a file server 217 supporting a file manager 218 that provides storage of, and access to, files in file storage 219. An enterprise user 222 employs conventional processing means (such as a computer or workstation) to support an application program 224 that interfaces with client logic 226. Conventionally, the client logic 226 includes database language commands. A first interface is in the form of a database language application programming interface (API) 227 that operates conventionally between the application 224 and the client logic 226. In addition, the user-processing configuration includes a second interface in the form of file system API 228 that provides the enterprise user 222 with access to the file system 214.

A database administrator 229 identifies data to be entered into the database system, decides form and content for the data, and, using a database language, sets up and fills the database. In this latter regard, the database administrator defines data entities and establishes the scheme that supports requests from the enterprise user.

Requests from the enterprise user 222 to the data system 212 and responses to requests are provided on a communication path 233 ("SQL communication path") between the user's processor and the DBMS 215. User requests include retrieval, updating, and deletion of data and addition of new data to the database.

The communication path 234 ("file communication path") between the file system API 228 and file manager 218 enables the enterprise user 222 to create, store, and request files in the file system 214.

In the practice of the invention, one or more application programming interfaces APIs 240 in the DBMS 215 and a database agent 241 in the file management system 217 are the respective terminals of a communication path 242 between the database system 212 and the file system 214 for exchange of information between the systems respecting files in the file system 214. Specifically, the communication path 242 provides the means by which the DBMS 215 provides control information to the file system 214 that causes the file system to control processing of files according to referential integrity constraints established at the database system 212. In this description, the communication path 242 is also referred to as the "control communication path."

The file system 214 may also be accessed by users such as the file system user 230 without the database system 212 as an intermediary.

Preferably, except for the communication path 242, the file system 214 operates independently of, and is external to, the database system 212; that is, its role is not to serve the DBMS 215 in accessing the database storage 216.

Figure 7:
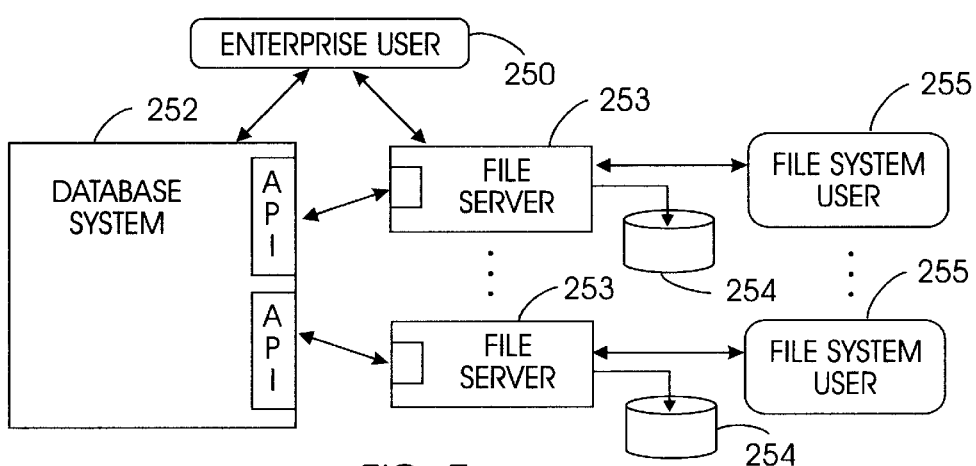
FIG. 7 shows a block diagram illustrating a variant of the enterprise system architecture of FIG. 6 in which a file management system includes multiple file servers.

An alternate arrangement of an enterprise system is shown in FIG. 7, and includes an enterprise user 250 coupled to a database system 252 and to a distributed file system including a plurality of file servers 253 with disk storage 254 that may be accessed independently by a plurality of file system users 255.

In the discussion of the preferred embodiment that follows, it is assumed that the database system that will be discussed is a relational database system (RDBS) and that the database language used with it is SQL. However, it will be manifest to the reasonably skilled artisan that the principles of the invention are not limited to the combination of an RDBS or the SQL language with a file system. Indeed, teachings respecting the preferred embodiment are applicable to other database schemas and languages.

Further, the following discussion uses the term "file system" to denote a system of hardware and software that provides means for retrieval and management of files. When a file system resides in a node, which is configured as network of computers, additional software can provide the local/remote transparency for file access. The file system and the additional software is then referred to as "the file server". The discussion assumes that a file server is a component of a particular kind of file system. This is not meant to limit the invention to being practiced only with file systems that include file servers.

Figure 8:
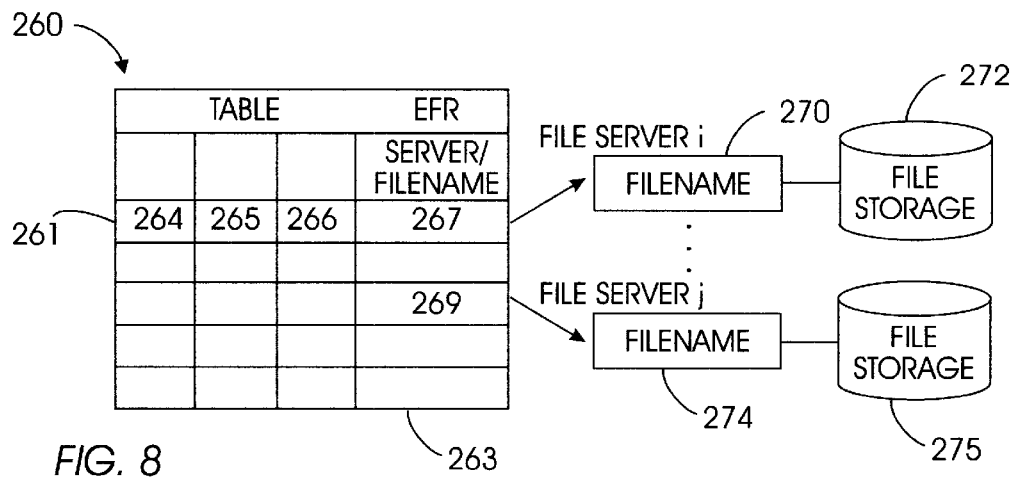
FIG. 8 shows a block diagram illustrating specific links between a table in a relational database system and files in a file system.

Referring now to FIG. 8, a relational database system is based upon the existence of relations that may be illustrated as tables, such as the table 60 in FIG. 8. The table 260 includes a plurality of columns, such as column 263, that essentially define respective fields of table rows, such as the row 261. For example, the four columns of the Table 260 in FIG. 8 establish four fields 264, 265, 266, and 267 of the row 261. In relational database systems, rows are also referred to as "tuples". Table columns, such as column 263, are also referred to as "attributes". Columns may be defined over "data types".

The invention provides for the definition of relations that accommodate existence of an attribute that refers in some way to a file in a file system. For such columns, the invention provides a new data type in the relational database system. This data type is referred to as the "external file reference" (efr) data type. Preferably, the data structure for the efr data type includes the name of a server and the name of a file (filename). Relatedly, assume that column 263 has been defined over the efr data type. Assume further that the field 267 of tuple 261 contains server/filename, a reference identifying a file server (server i) that controls a file 270 (filename) in file storage 272. Similarly, the tuple field 269 is an efr data type containing server j/filename, a reference to server j controlling the file 274 stored in the file storage 275.

The novel efr data type provided by this invention supports a database system behavior that causes the DBMS to issue a "LinkFile"("UnlinkFile") command to an appropriate file server for the named file when an enterprise user issues an SQL insert/update (delete/update) call. The procedures that implement the LinkFile command (described in more detail below) apply constraints to the file. Such constraints include, for example, making a database system the owner of the named file and marking the file as read only. The invention provides this linkage in a transactional scope. The rationale for changing the owner of the file to the database system from a file system user is to prevent the file from being renamed or deleted by file system users, which guarantees the integrity of any reference made in the database system to the file. Marking the file as read only guarantees the integrity of indexes that may be created on the file and stored in the database system for search. Thus, the database link embodied in the LinkFile command applies constraints that prevent renaming or deletion of the file by a file system user once the file is referred to in the database system.

With reference to FIGS. 6 and 8, the invention employs an application such as the application 224 and standard interfaces such as an SQL API 227 for database access and the file system API 228 for standard file system calls (such as open, read, close) to access files. An application scenario would unfold as follows. Assume the application 224 issues an SQL SELECT statement to search on the database in the database storage 216. Assume that the database includes the relation 260. In this regard, the query returns its results, which include one or more server/filename references as normal column data in the efr data structure (assuming any efr column is selected in the query). The application 224 can then use the file system API 228 and the file communication path 234, employing standard file system protocols to access the relevant portion of a file.

Note that the invention does not interpose a database system in the file communication path 234, which provides file access. The operation of the invention only interposes in the file system when a file is opened, renamed, or deleted. Significantly, the invention can, therefore, be used with stream servers (such as video servers) and provide the added value of a robust link between such servers and a database system without the database system being in the file access path.

The invention imposes no data model of its own for applications. The data model is whatever can be supported by the relational model (or any other database scheme).

Figure 9:
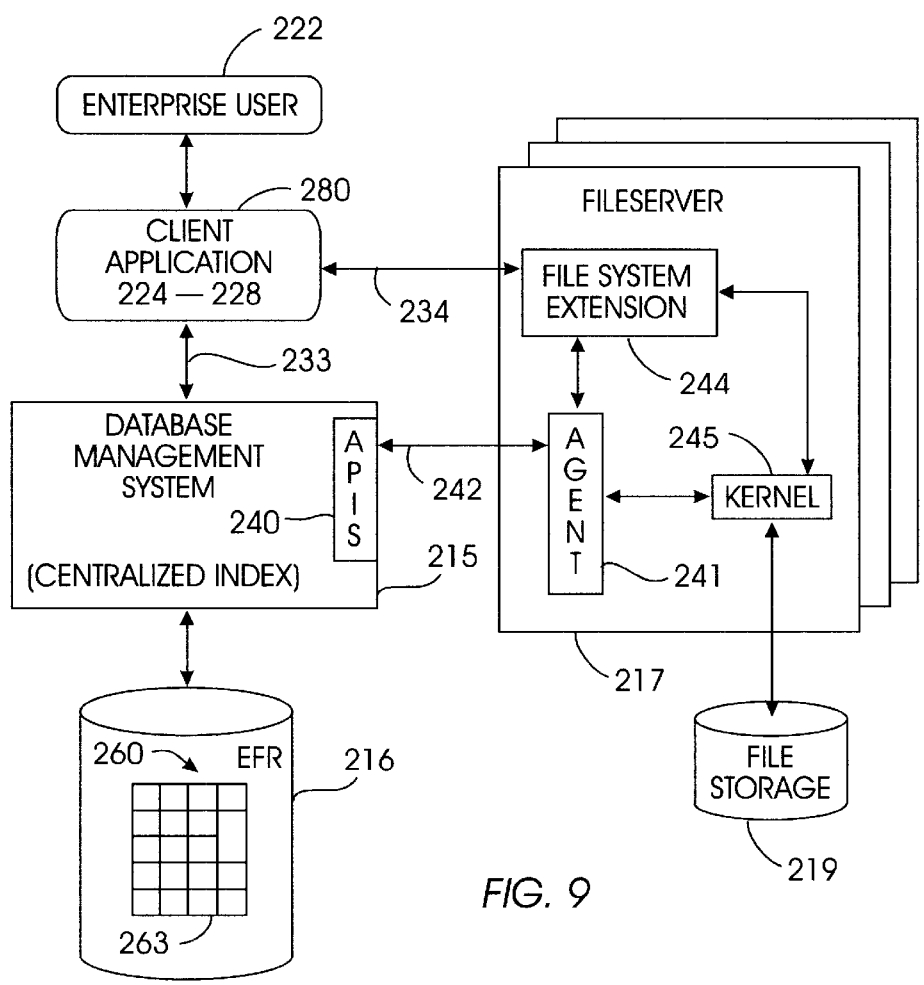
FIG. 9 shows a block diagram illustrating a preferred enterprise system architecture according to a preferred embodiment of the invention.

Referring now to FIGS. 8 and 9, the enterprise configuration implicit in FIG. 8 is possible when objects are stored as files in a file server but are linked to a database system by references in database tuples. In this case, the database system can act as a centralized index for searching across the enterprise-wide data that includes both enterprise data and extracted features of non-coded data, and large objects that can be distributed among several file servers. Such a configuration can save network costs since the large objects can be stored close to end users and, therefore, can be delivered over shorter distances. Note that such a configuration would not be possible if the large objects were stored in the database system.

FIG. 9 illustrates an essential architecture for a combination of the enterprise system illustrated in FIG. 6 and the efr data type that allows the definition of relations such as the relation 260 in FIG. 8. In FIG. 9, a client application 280 includes the application 224, client logic 226, SQL API 227, and file system API 228 of FIG. 6 that represent the enterprise user 222. The client application 280 communicates with the DBMS 215 by the SQL communication path 233 and communicates with the file server 217 by the file communication path 234. The DBMS 215 and file server 217 are coupled by the control communication path 242 over which the APIs 240 communicate with the database agent 241. The database stored at 216 includes one or more relations with efr data types, such as the table 260 of FIG. 8. The essential architecture of FIG. 9 provides a centralized database system with distributed file servers. The invention is implemented in standard API's for database and file system access. The architecture requires no modification of any file manager in any file server.

Those skilled in the art will appreciate that the techniques disclosed in FIGS. 6–9 for linking a database system with a system for filing data may be readily applied to implement the linking of a database with a persistent object system, as shown in FIGS. 4 and 5 and described above. In particular, the necessary file extensions, such as file extensions 244 in FIG. 6, may be added to the persistent object system on the server machines 66 and 86, shown in FIGS. 4 and 5 respectively. For example, the database agent 108 shown in FIG. 5 performs the functions as described in connection therewith and also the functions of the database agent 241 of FIG. 6 with appropriate modifications. The particular additional modifications to the disclosed techniques for linking the database system 88 shown in FIG. 5 with the persistent object system on machines 84 and 86 in FIG. 5 are within the abilities on one skilled in the art, whether the persistent object system is implemented using Java RMI, or some other distributed persistent object system.

Figure 10:
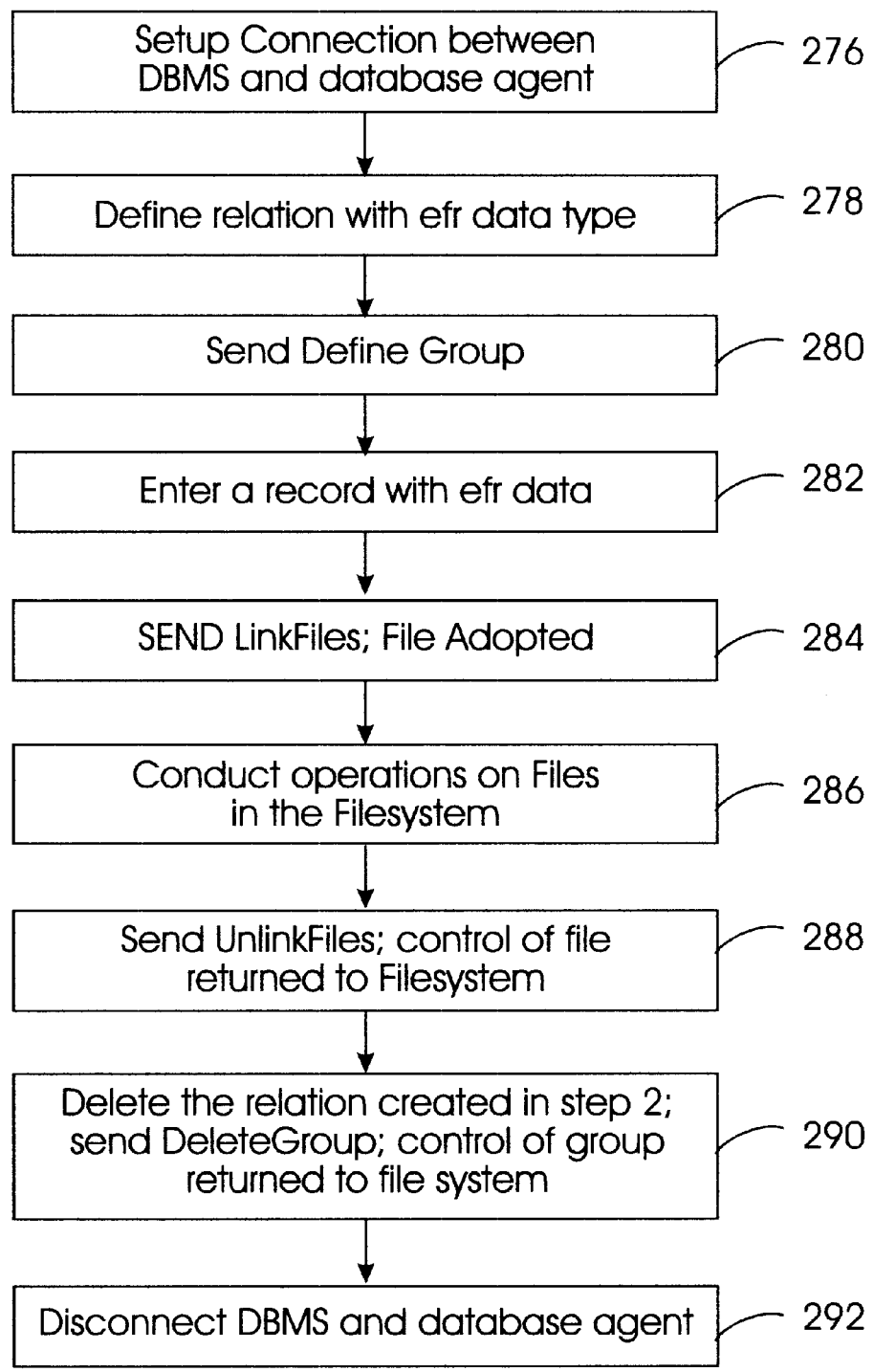
FIG. 10 shows a process flow diagram illustrating an overall method according to the invention.

Now, with reference to FIGS. 5 and 10, the overall processing according to the invention will be explained. Initially, the database system 88 is presumed to be connected to a communications interface such as a network that provides communications with the persistent object system on machines 80 and 86. In Step 276, the database system 88 creates a connection with the persistent object system on machines 80 and 86 using the Connect command, and the connection is parameterized with the Query limits command. A relation with one or more efr data types is defined in the database system 88 in Step 278. In Step 280, the Define Group command is issued to the database agent 241. A tuple with a reference to a file in the persistent object system is entered into the relation in Step 282. In Step 284, a LinkFile command is issued to the database agent 241, causing the database agent to name the DBMS 215 as the owner of the named file in the file system 214. This control information causes the persistent object system to control processing according to the referential integrity constraints implicit in ownership of the file by the DBMS 215 (which include prevention of any file system user from deletion, renaming the file) and any other constraints explicitly included in the LinkFile command. Other processing according to the OPEN and READ examples given above may be conducted in Step 286. In Step 288 the file filename is unlinked by an UnlinkFile command, returning control by the file to the persistent object system, or deleting the file altogether. In Step 290 the relation defined in Step 278 is deleted, causing the DBMS 215 to issue a Delete Group command. In Step 290, the database agent 241 deletes the group named in Step 278, returning ownership of the files of the group to the persistent object system, or deleting them altogether. In Step 292, the Disconnect command is issued, disestablishing the connection and breaking the link 241.

Figure 11:
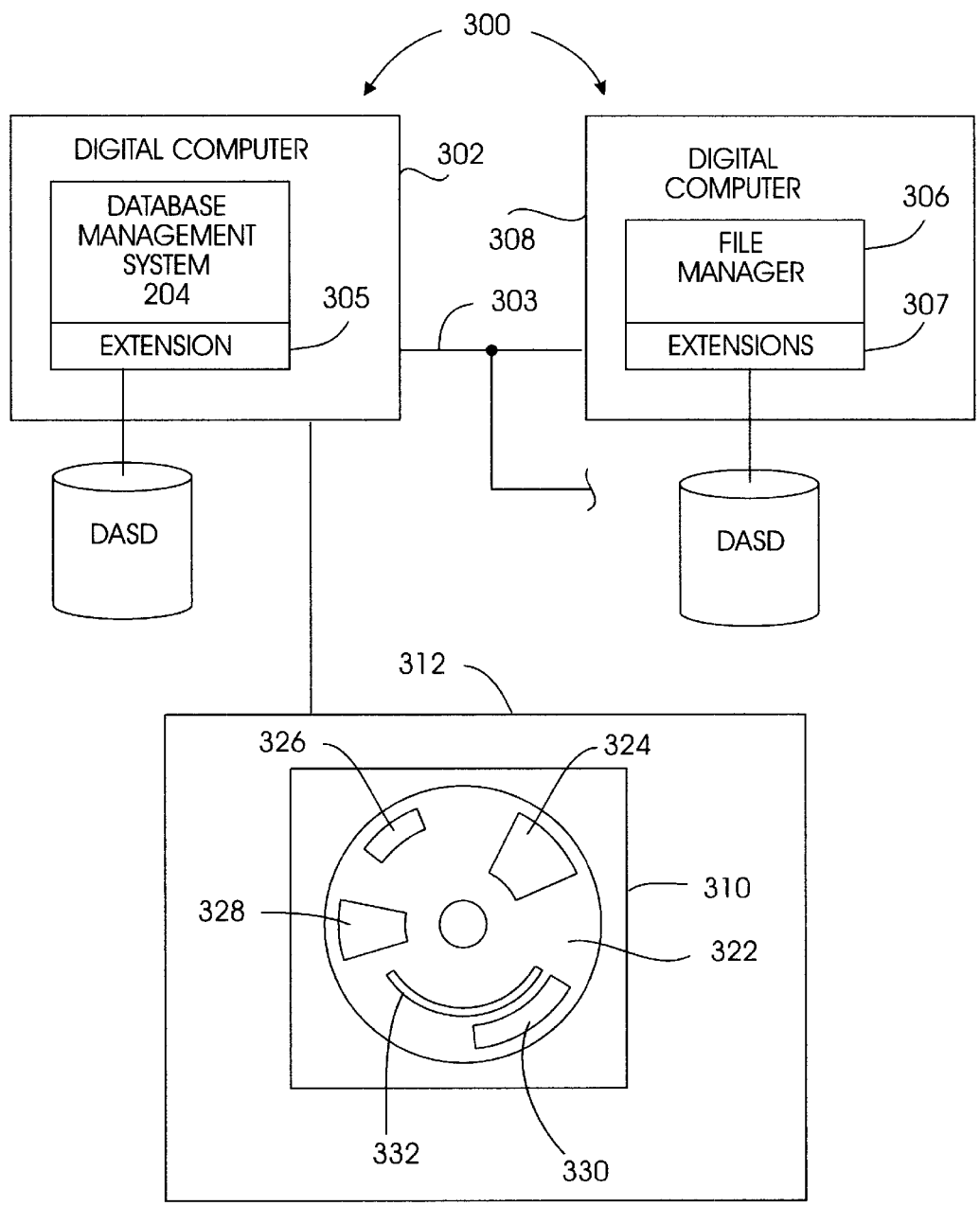
FIG. 11 shows a block diagram illustrating a computer system with a computer program product in which the invention is embodied.

FIG. 11 illustrates a digital computer system 300 that can be programmed or otherwise designed to facilitate practice by the invention. As an example, the database system 88 of FIG. 5 can be implemented in a digital computer 302 of the RS-6000 type on which a DBMS 304 (such as the DB2 product available from the assignee of this application) may be installed. Alternatively, the database system may include the DB2 product executing on a System 390 mainframe computer. The persistent object system 36 may include a file system 306, such as an AIX file system, executing on a digital computer 308 of the RS-6000 type. A communications facility 303, which may be a multinode network, couples the computers 302 and 308. The inventor points out that, while the digital computers shown in FIG. 11 are separate, this invention may be implemented using a single digital computer of the RS-6000 type on which the database and file systems were separately executed using the multi-processing capability of the machine.

The invention as embodied in extensions 305, 307 to the DBMS 88 and persistent object system 36 that may be embodied in an article of manufacture such as one or more pre-recorded data storage devices including the device 310. The pre-recorded data storage devices may include, for example, magnetically recorded disks or tapes, or optically recorded CD-ROMS. The APIs 240, shown in FIG. 6 may be rendered as one or more computer software programs recorded on the pre-recorded data storage devices and integrated or linked with the DBMS 88 by conventional means including the storage drive 312.

Relatedly, the storage device 310 includes recording medium 322 on which is recorded program portions 324, 326, 328, 330, and 332, each for directing a digital computer, such as the digital computers 302 and 308 to facilitate the practice of some portion of the procedures of this invention. Even where no single program portion 324–332 includes the entire group of procedures described above, the portions may comprise all program means necessary to direct a digital computer to operate according to the invention. Therefore, it can readily be appreciated that a computer program product including the storage device 310, recording medium 322, and program portions 324–332 falls within the spirit and scope of the invention.

Further, it should be manifest that many other embodiments and variations of this invention may occur to the skilled artisan applying these teachings to a particular problem. One evident variation is the use of the invention in an enterprise system that includes a database system and a persistent object system that is external to the database system. The invention, therefore, is limited only by the following claims.

What is claimed is:

1. A method for managing a distributed object system having objects stored in object system files, the distributed object system being connected to a client application, the method comprising the steps of:

creating a connection between a database system and the distributed object system for exchange of information between the database system and the distributed object system files; and providing control information on the connection between the database system and the distributed object system files, which causes the distributed object system to control processing of the objects in the distributed object system files according to constraints established at the database system.

2. The method of claim 1 further including;

defining an external file reference data type in the database system for reference to the objects in the distributed object system files; and entering data into the database system, which includes an external file reference data type field that contains a reference to an object in the distributed object system files.

3. The method of claim 2, wherein the client application includes a first interface with the database system and a second interface with the distributed object system, further including the steps of:

providing a request from the client application to the database system through the first interface for invoking a method on the object; and providing a response from the database system to the distributed object system through said connection that includes the request for invoking a method on the object.

4. The method of claim 3 further including the step of obtaining a return value from the object in the distributed object system through the second interface.

5. The method of claim 4 further including the step of using said connection to transfer the state of the object to the database system.

6. The method of claim 5 further including the step of using said connection to transfer the state of the object system to the database system.

7. The method of claim 3 wherein:

the step of providing a request from the client application includes providing authorizing data with the request; and the step of providing a response from the database system includes generating access authorization information.

8. The method of claim 3 wherein the distributed object system is an activation object system having persistent activatable objects, further including the steps of:

in the step of providing a request from the client application to the database system, the request includes a request to activate an object.

9. The method of claim 2, wherein the client application includes a first interface with the database system and a second interface with the distributed object system, further including the steps of:

providing a request from the client application to the database system through the first interface for information relating to an object in the distributed object system; and providing a response from the database system to the client application that includes the information relating to the object previously stored in the database system.

10. The method of claim 1 wherein the distributed object management system is a Java RMI system and further including:

providing a register( ) method which saves the state of an object in the database system when the object is registered to the distributed object system.

11. The method of claim 8 further including the step of providing a make_persistent( ) method which causes the database system to make the object persistent.

12. A system for managing a distributed object system that includes a server object and wherein objects are stored in files in the distributed object system, the system comprising:

a database system;

a client object;

a connection between the database system and the distributed object system for exchange of information between the database system and the distributed object system files; and means for providing control information on the connection between the database system and the distributed object system files, which causes the distributed object system to control processing of the objects in the distributed object system files according to constraints established at the database system.

13. The system of claim 12 further including:

means for defining a data type in the database system for reference to objects in the distributed object system;

the means for providing control information including means responsive to an entry in the database system which includes a reference of the defined data type to an object in the distributed object system.

14. The system of claim 13, further including:

a first interface between the client application and the database system; and a second interface between the client application and the distributed object system for obtaining objects from the distributed object system using references provided through the first interface.

15. The system according to claim 14 further including;

means for providing a request from the client application to the database system through the first interface for invoking a method on the object; and means for providing a response from the database system to the distributed object system through said connection that includes the request for invoking a method on the object.

16. The system of claim 14 further including means for obtaining a return value from the object in the distributed object system through the second interface.

17. The system of claim 14 further including means for using said connection to transfer the state of the object to the database system.

18. The system of claim 15 further including means for using said connection to transfer the state of the object system to the database system.

19. The system of claim 15 wherein:

the means for providing a request from the client application includes means for providing authorizing data with the request; and the means for providing a response from the database system includes means for generating access authorization information.

20. The system method of claim 15 wherein the distributed object system is an activation object system having persistent activatable objects, further including:

in the means for providing a request from the client application to the database system, the request includes a request to activate an object.

21. A computer program product comprising:

a computer useable medium having computer readable program code means embodied thereon for causing a database system to create a connection between the database system and a distributed object system for exchange of information between the database system and the distributed object system files; and a computer readable program code means embodied in the medium for causing control information on the connection between the database system and the distributed object system files to cause the distributed object system to control processing of the objects in the distributed object system files according to constraints established at the database system.

* * * * *